(12) United States Patent
Roh et al.

(10) Patent No.: US 9,755,780 B2
(45) Date of Patent: Sep. 5, 2017

(54) METHOD AND APPARATUS FOR DETERMINING MODULATION AND CODING SCHEME FEEDBACK IN WIRELESS LOCAL AREA NETWORK SYSTEM

(75) Inventors: Dong Wook Roh, Anyang-si (KR); Ill Soo Sohn, Anyang-si (KR); Kyoung Young Song, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 13/885,332

(22) PCT Filed: Nov. 14, 2011

(86) PCT No.: PCT/KR2011/008677
§ 371 (c)(1),
(2), (4) Date: May 14, 2013

(87) PCT Pub. No.: WO2012/067393
PCT Pub. Date: May 24, 2012

(65) Prior Publication Data
US 2013/0235836 A1    Sep. 12, 2013

Related U.S. Application Data

(60) Provisional application No. 61/413,602, filed on Nov. 15, 2010, provisional application No. 61/430,285, (Continued)

(51) Int. Cl.
*H04L 1/00* (2006.01)
*H04L 1/06* (2006.01)
*H04L 1/16* (2006.01)

(52) U.S. Cl.
CPC .......... *H04L 1/0004* (2013.01); *H04L 1/0031* (2013.01); *H04L 1/0003* (2013.01); (Continued)

(58) Field of Classification Search
None
See application file for complete search history.

(56) References Cited

U.S. PATENT DOCUMENTS

2006/0248429 A1    11/2006  Grandhi et al.
2007/0298742 A1*   12/2007  Ketchum et al. .......... 455/186.1
(Continued)

FOREIGN PATENT DOCUMENTS

| KR | 10-2006-0106899 A | 10/2006 |
| KR | 10-2007-0049050 A | 5/2007 |
| KR | 10-2008-0084406 A | 9/2008 |

OTHER PUBLICATIONS

Kim et al. "GroupID Concept for Downlink MU-MIMO Transmission", IEEE 802.11-10/0073r0, Jan. 18, 2010, Slide 1-Slide 8.
Zhang et al., "802.11ac Preamble," doc.:IEEE 802.11-10/0070r0, Jan. 18, 2010, slides 1-11.

*Primary Examiner* — Huy D Vu
*Assistant Examiner* — Hong Shao
(74) *Attorney, Agent, or Firm* — Birch, Stewart, Kolasch & Birch, LLP

(57) ABSTRACT

The present invention relates to a method of determining a Modulation and Coding Scheme (MCS) feedback in a Wireless Local Area Network (WLAN) system, including an MCS FeedBack (MFB) responder receiving a first frame, including a request message requesting to send the MFB, from an MFB requester and the MFB responder sending the MFB, including a recommended MCS value, to the MFB requester. The recommended MCS value is derived with reference to at least one of unsolicit type information indicative of a type of the MFB, transmit type information
(Continued)

indicative of a transmission type of data, coding type information indicative of a coding scheme applied to the data, a group ID indicative of a group of target stations (STAs) to which the data will be transmitted, and MFB bandwidth information indicative of a bandwidth of a channel.

8 Claims, 16 Drawing Sheets

Related U.S. Application Data filed on Jan. 6, 2011, provisional application No. 61/431,948, filed on Jan. 12, 2011.

(52) U.S. Cl.
CPC .......... *H04L 1/0009* (2013.01); *H04L 1/0079* (2013.01); *H04L 1/0618* (2013.01); *H04L 1/1685* (2013.01)

(56) References Cited

U.S. PATENT DOCUMENTS

| | | | |
|---|---|---|---|
| 2008/0247370 A1* | 10/2008 | Gu et al. ................ | 370/338 |
| 2008/0316981 A1* | 12/2008 | Trainin ................... | 370/338 |
| 2011/0032875 A1* | 2/2011 | Erceg .............. | H04B 7/0452 |
| | | | 370/328 |
| 2011/0116487 A1* | 5/2011 | Grandhi ................. | 370/338 |
| 2011/0188482 A1* | 8/2011 | Vermani et al. ........ | 370/338 |

* cited by examiner

[Fig. 1]
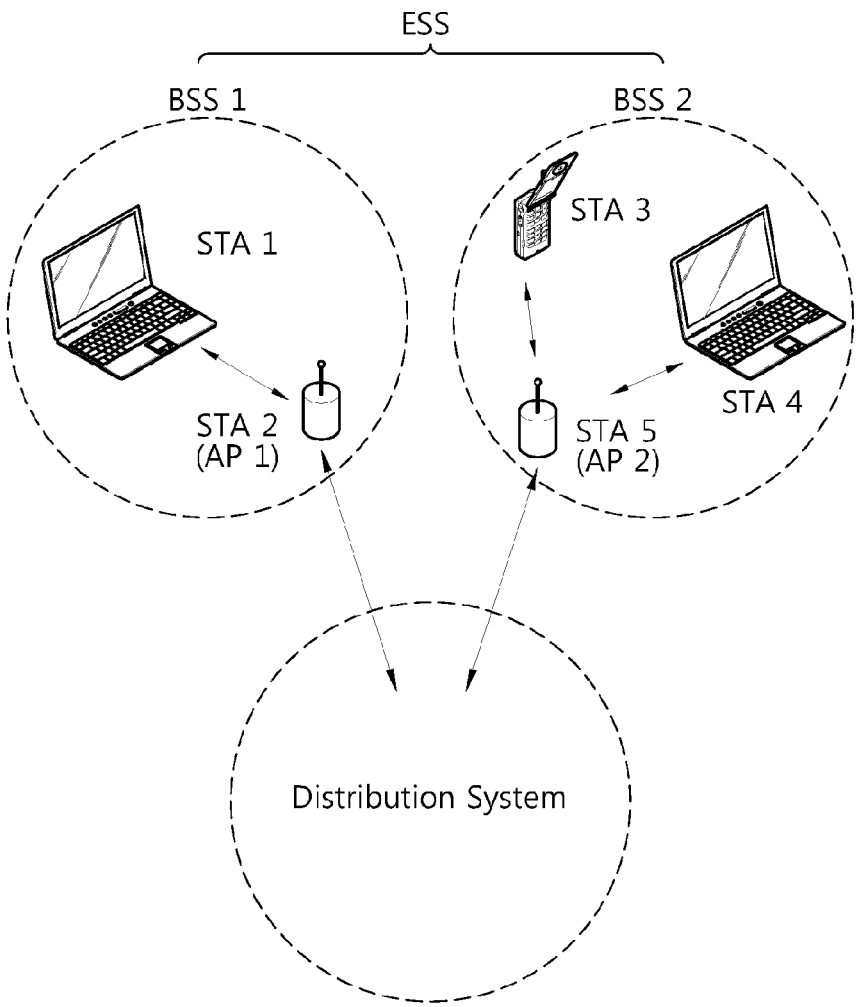
[Fig. 2]
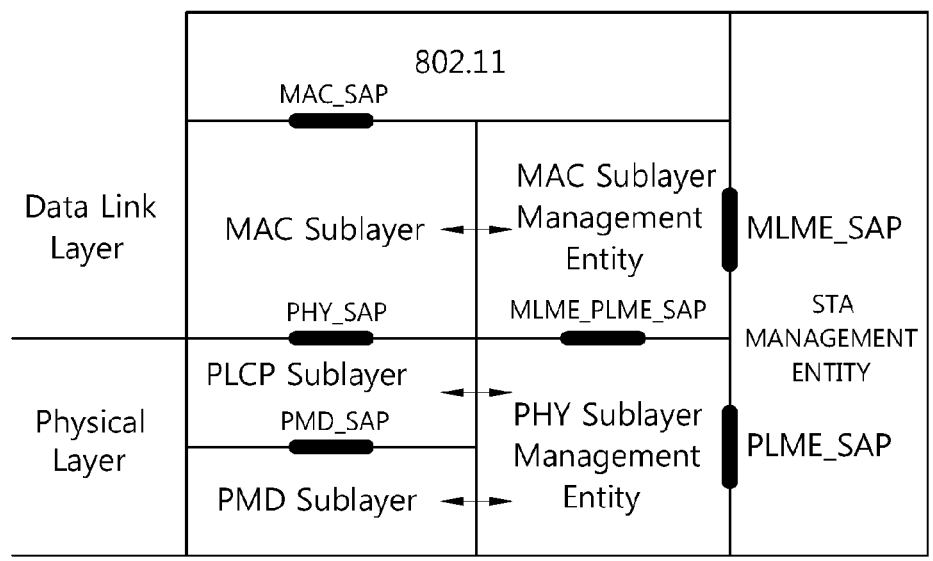

[Fig. 3]
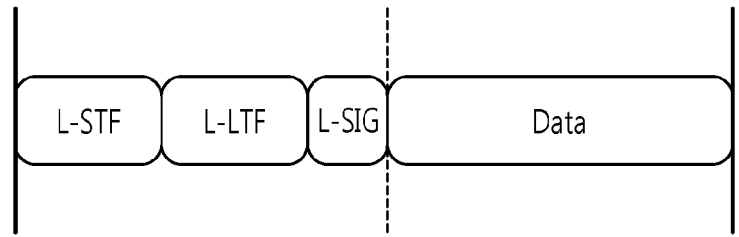
[Fig. 4]
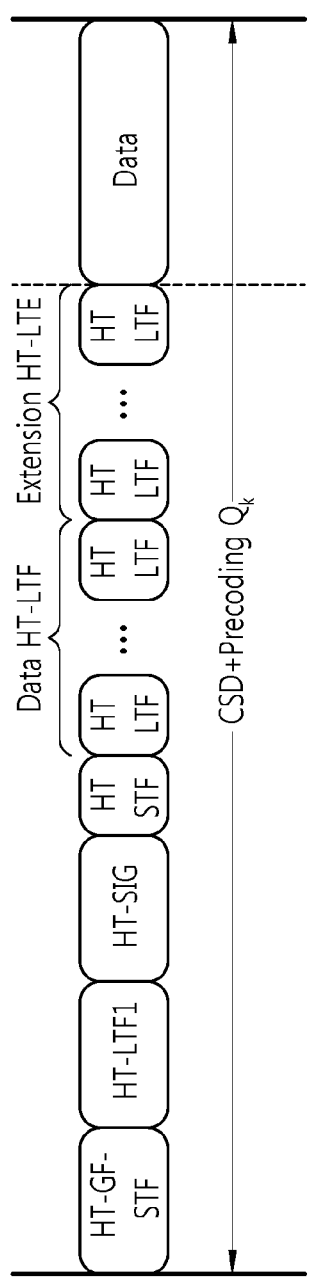

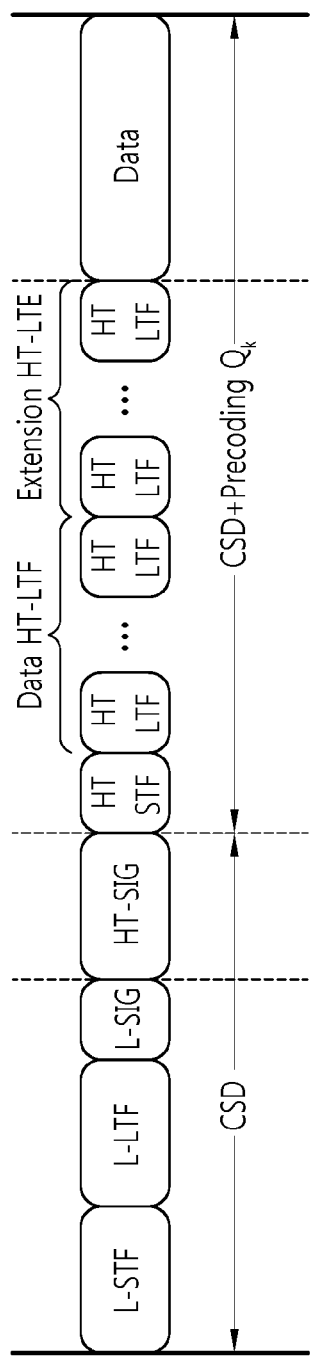
[Fig. 5]

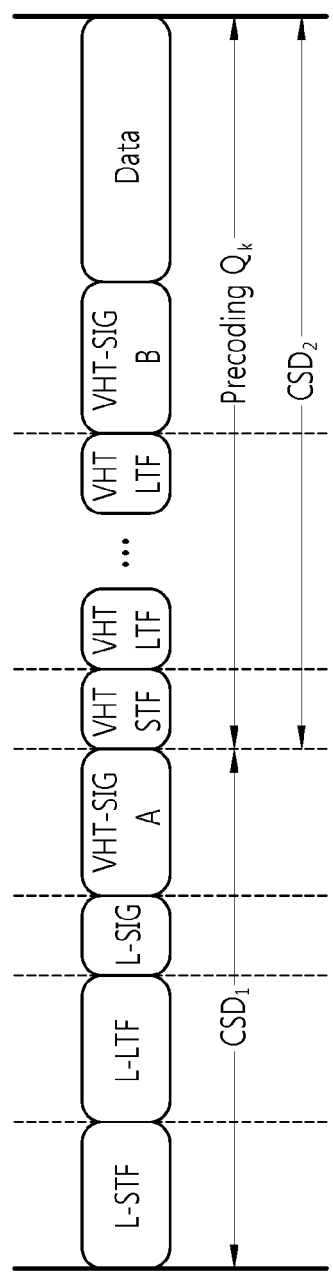
[Fig. 6]

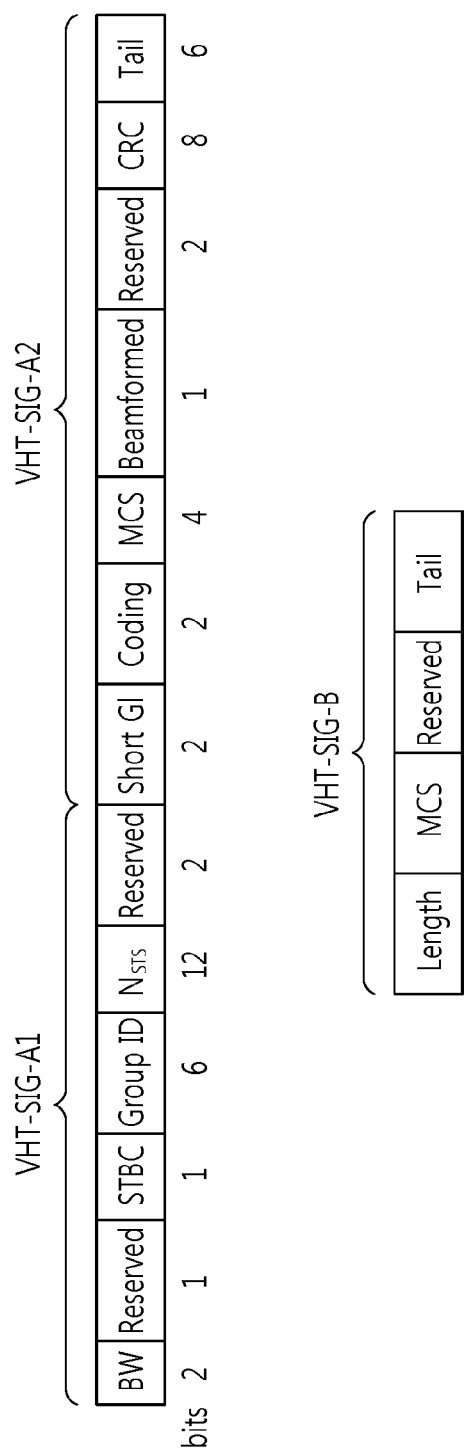
[Fig. 7]

[Fig. 8]
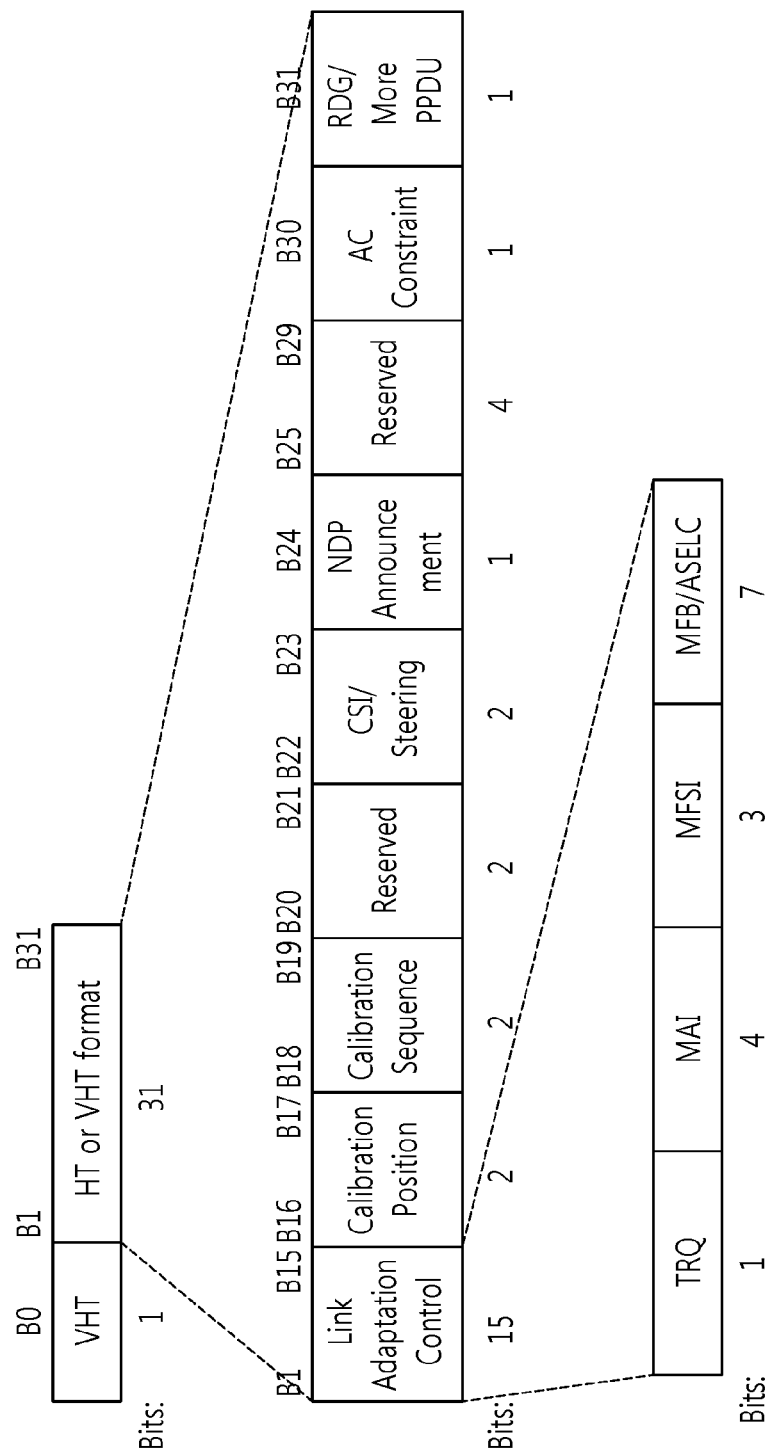

[Fig. 9]
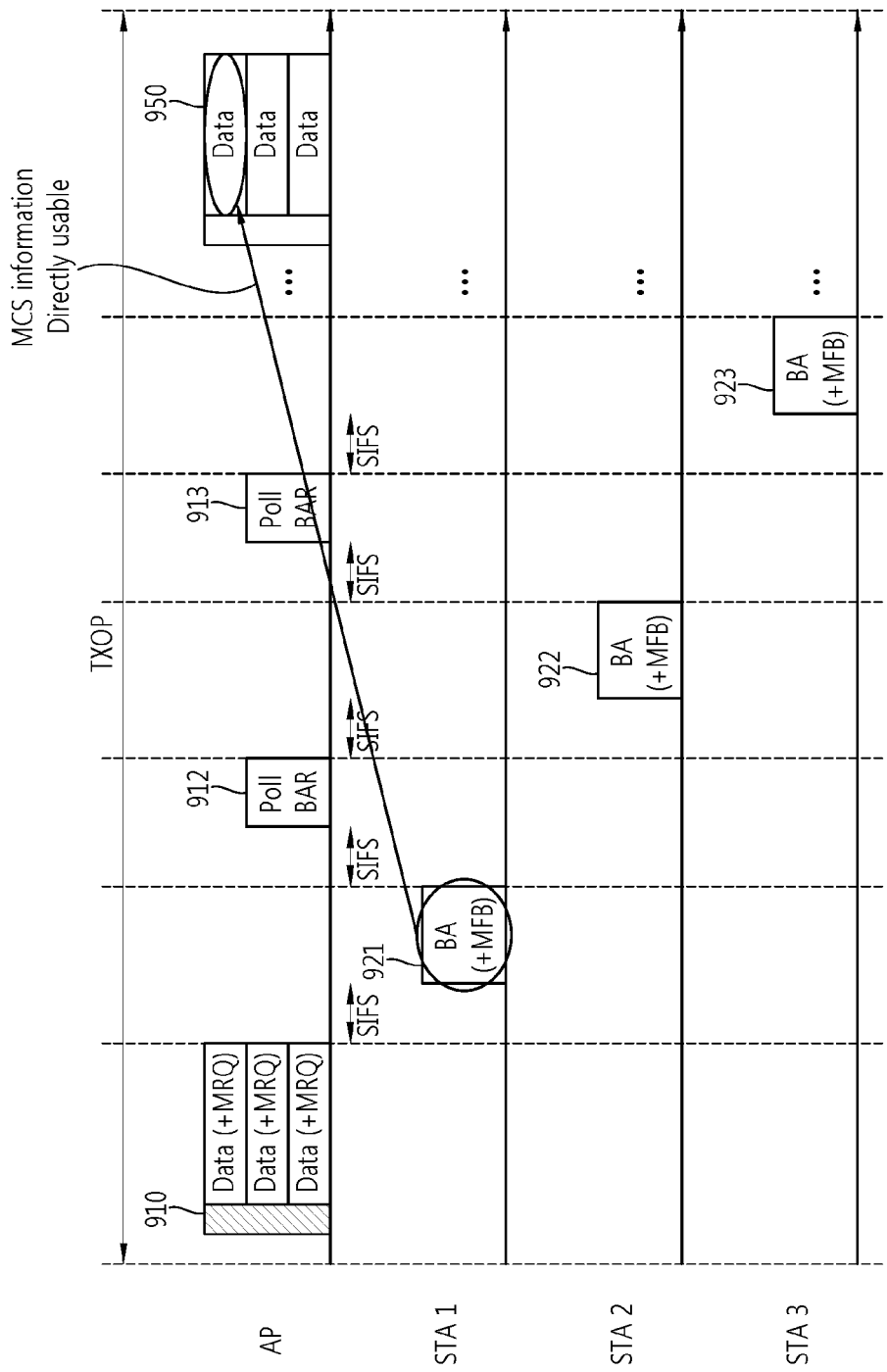

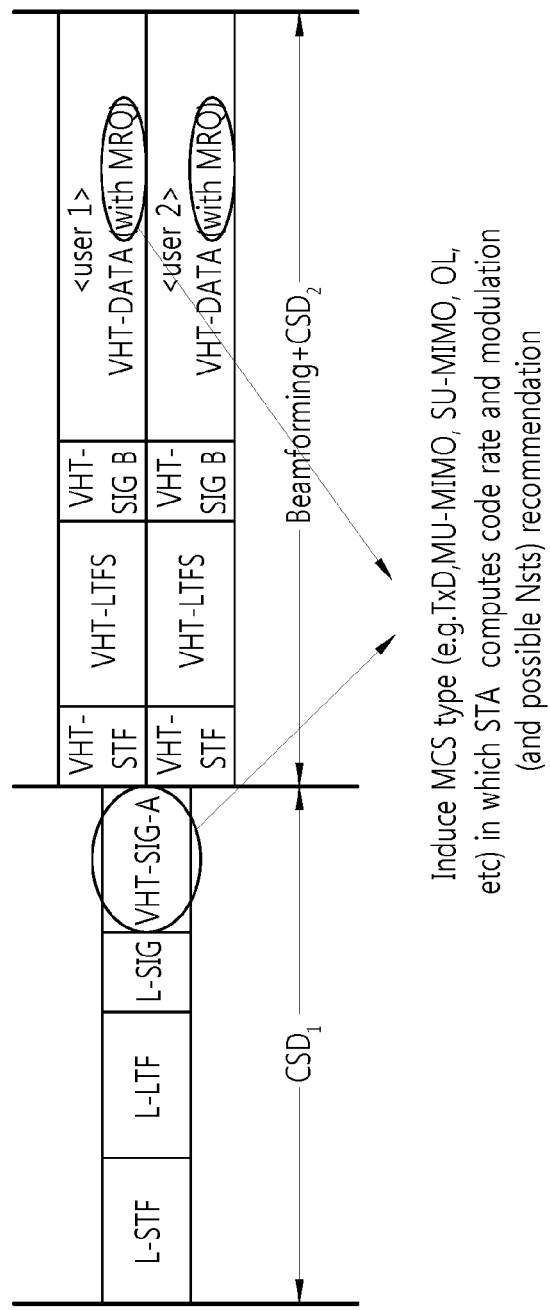

[Fig. 11]
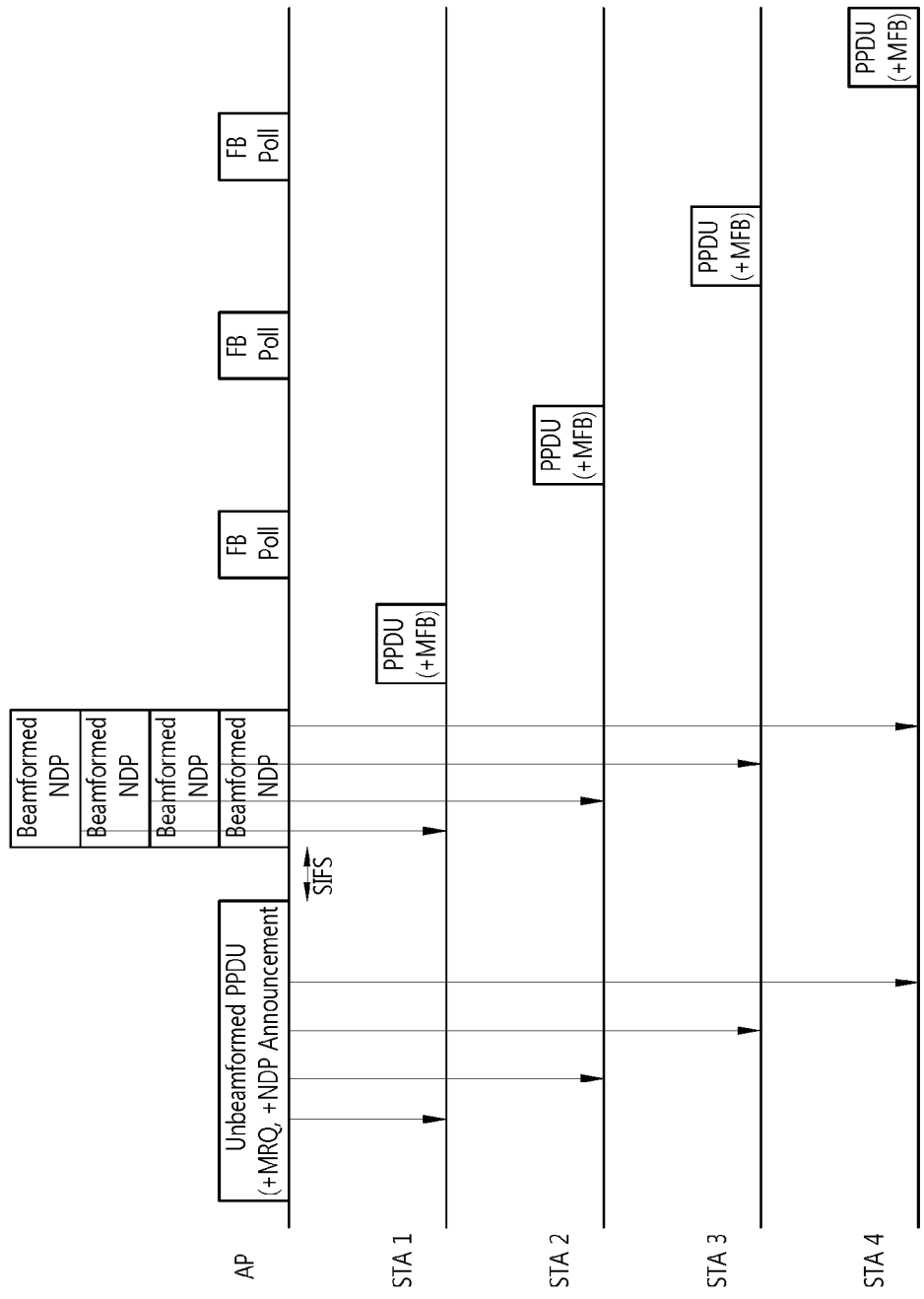

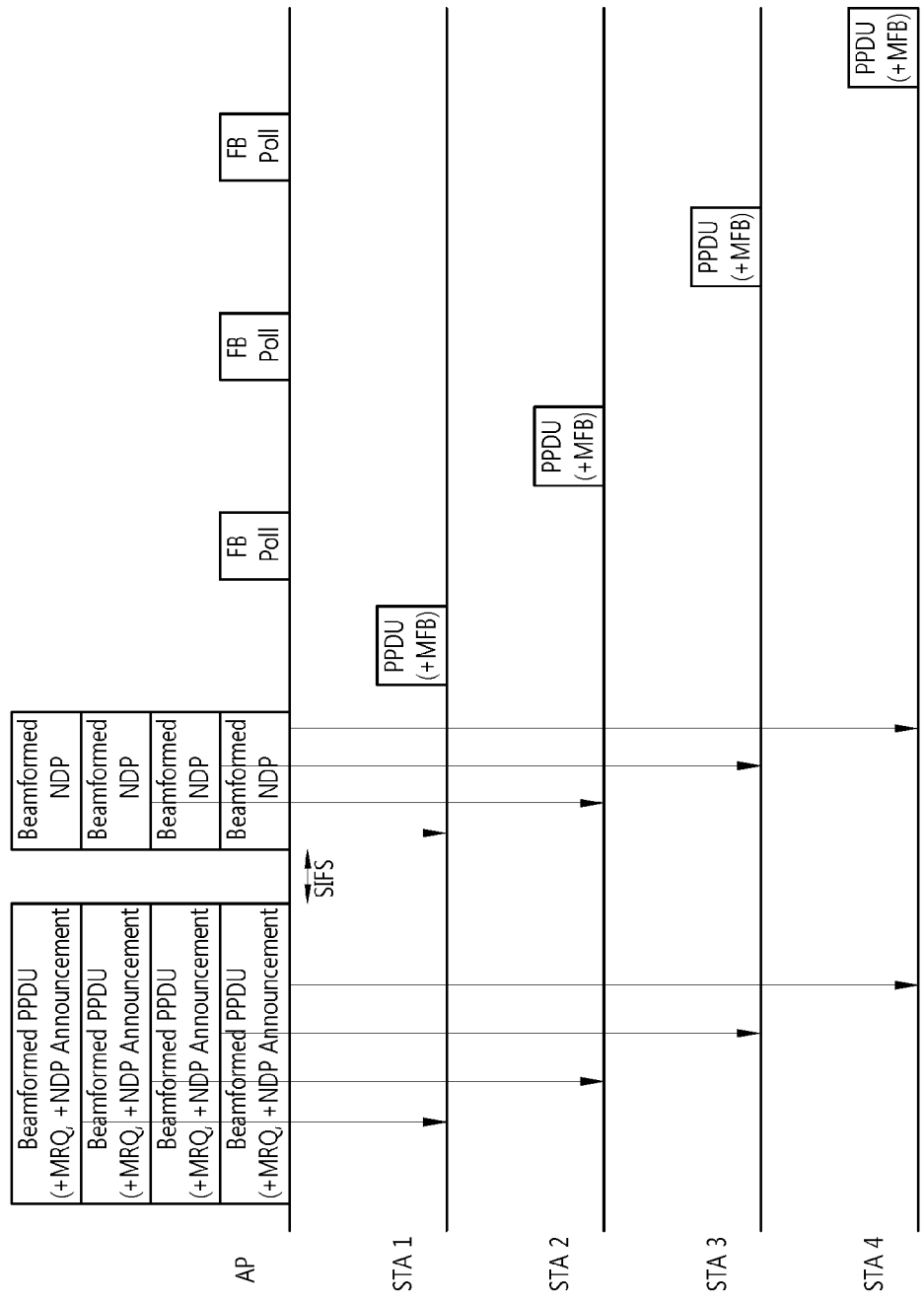
[Fig. 12]

[Fig. 13]
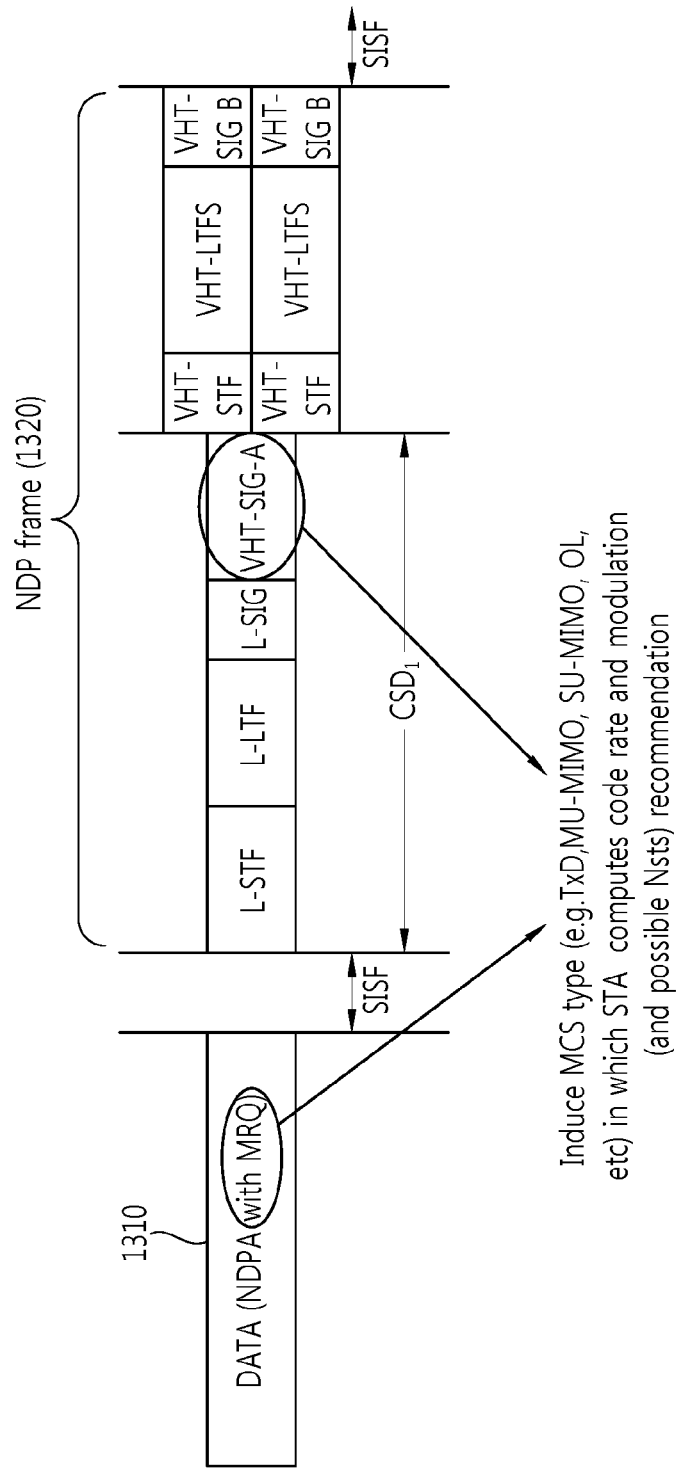

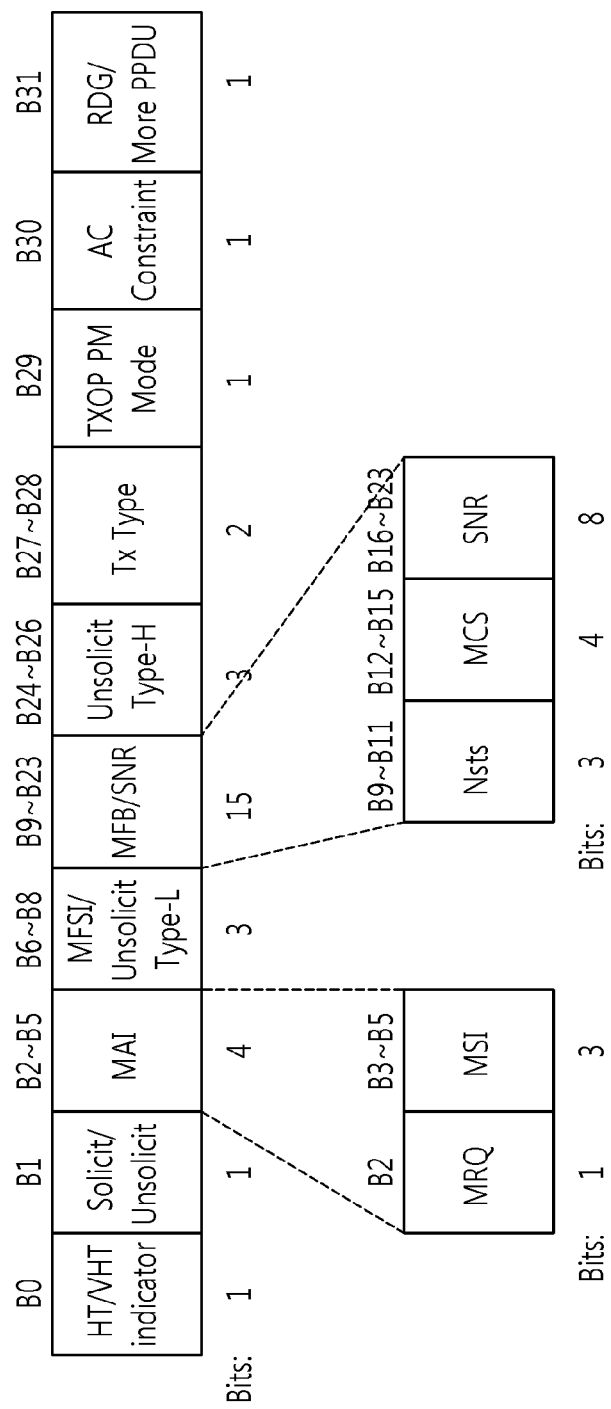
[Fig. 14]

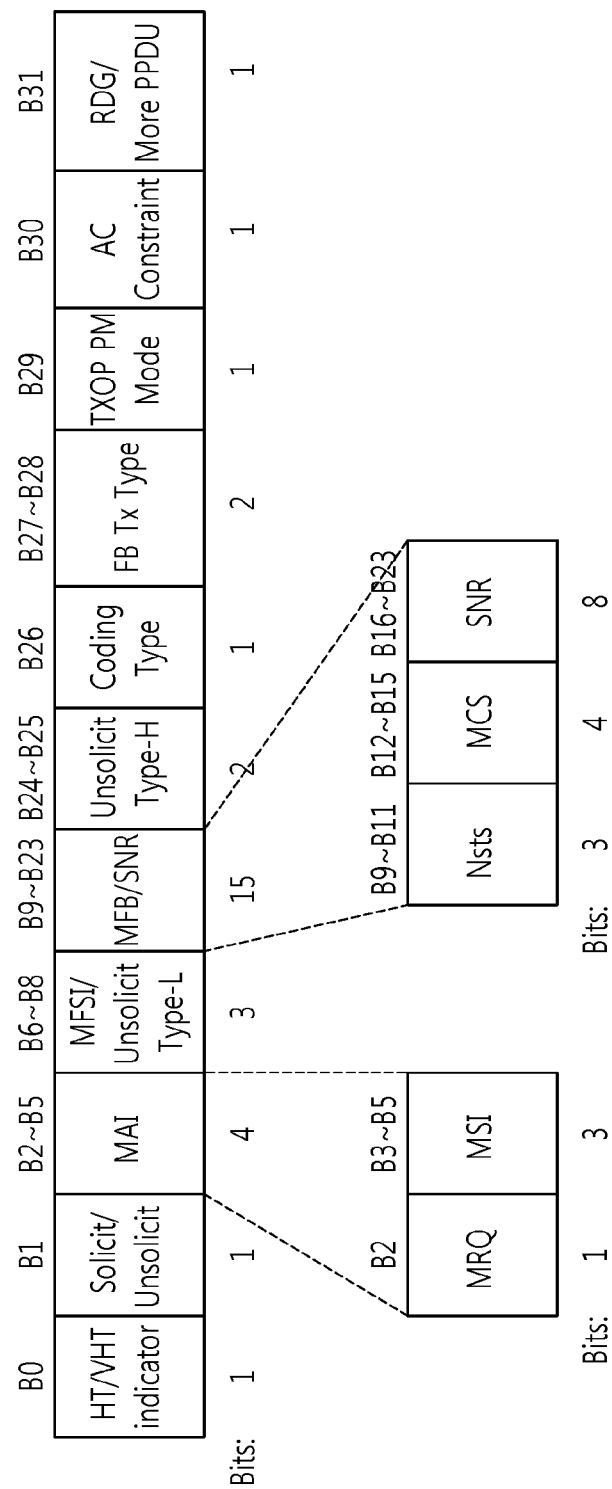
[Fig. 15]

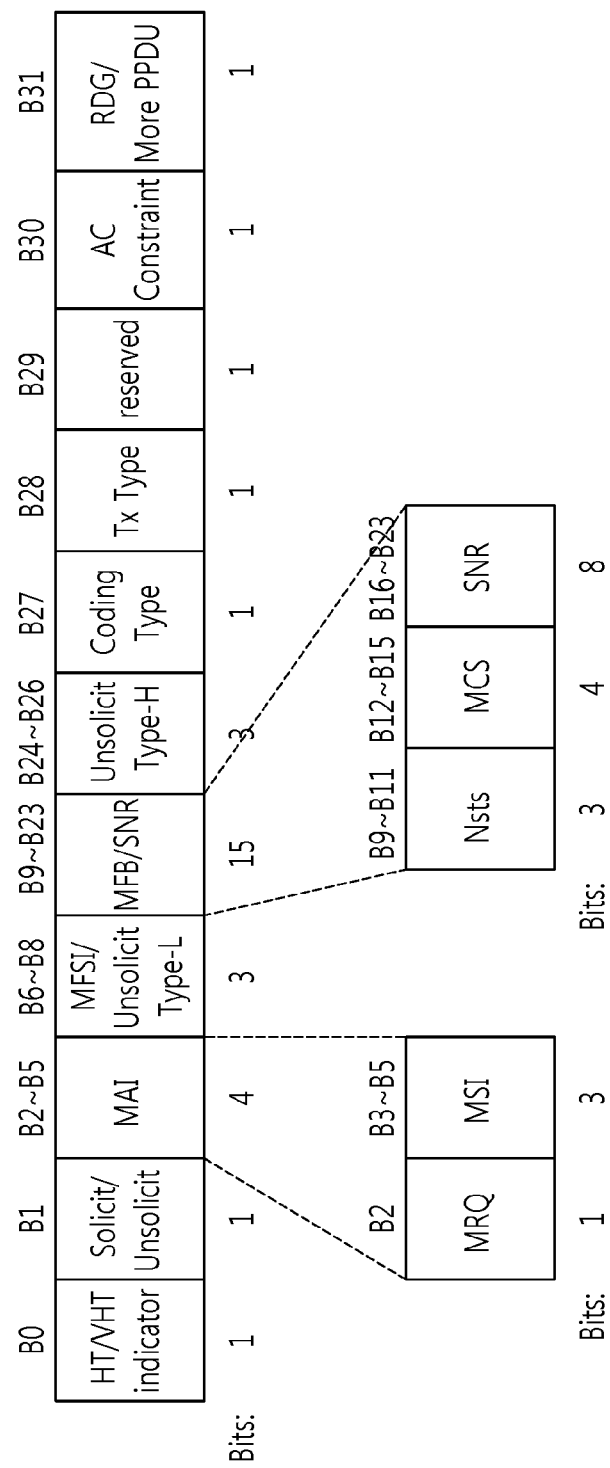
[Fig. 16]

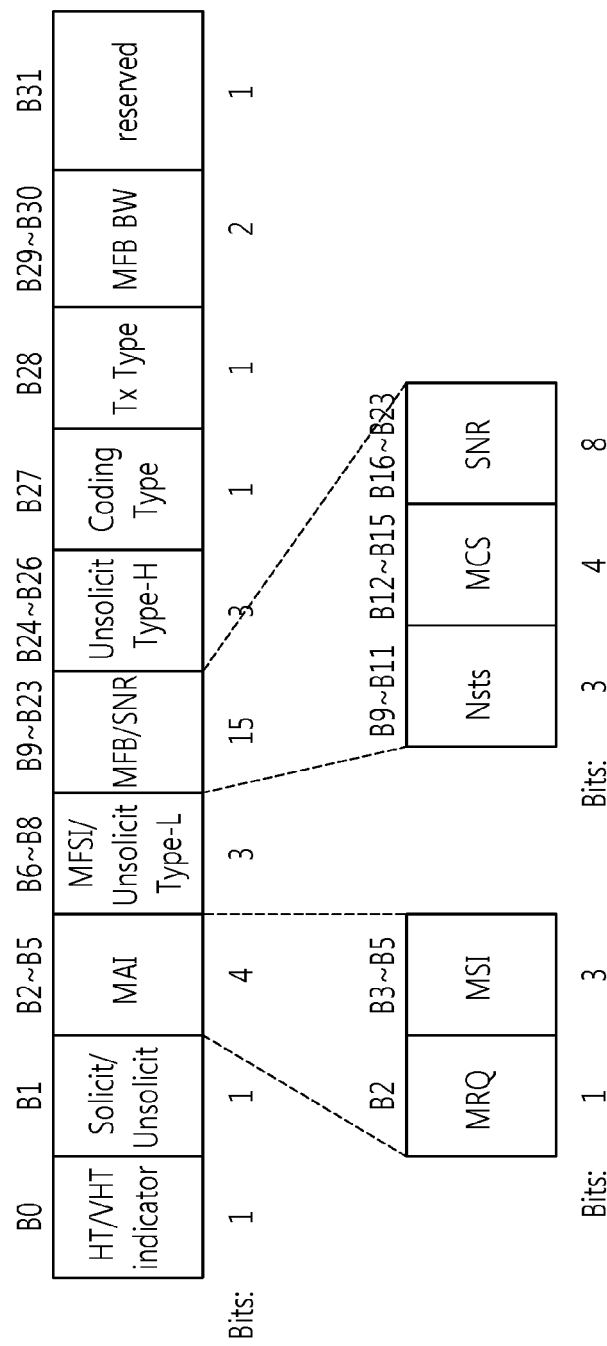
[Fig. 17]

[Fig. 18]
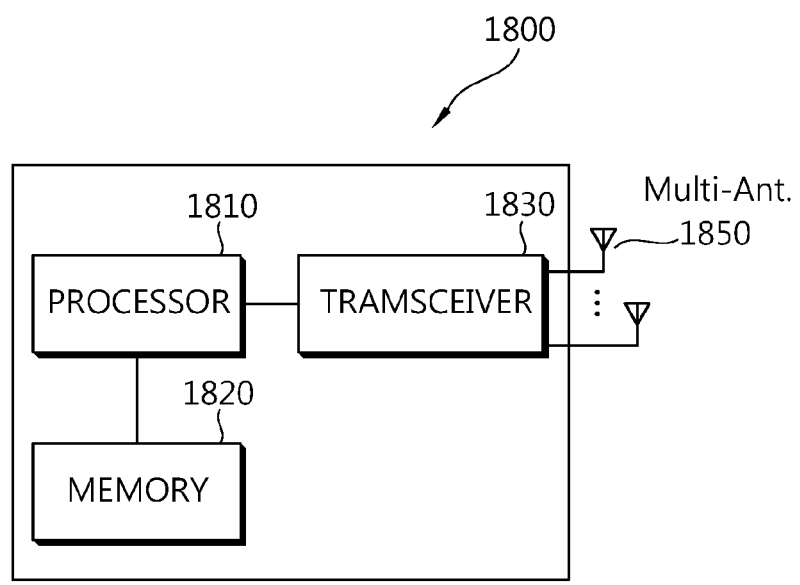

METHOD AND APPARATUS FOR DETERMINING MODULATION AND CODING SCHEME FEEDBACK IN WIRELESS LOCAL AREA NETWORK SYSTEM

CROSS-REFERENCE TO RELATED APPLICATIONS

This application is the National Phase of PCT/KR2011/008677 filed on Nov. 14, 2011, which claims priority under 35 U.S.C. 119(e) to U.S. Provisional Application No. 61/413,602 filed on Nov. 15, 2010; U.S. Provisional Application No. 61/430,285 filed on Jan. 6, 2011 and U.S. Provisional Application No. 61/431,948 filed on Jan. 12, 2011, all of which are hereby expressly incorporated by reference into the present application.

TECHNICAL FIELD

The present invention relates to wireless communication and, more particularly, to a method of determining a Modulation and Coding Scheme (MCS) feedback in a Wireless Local Area Network (WLAN) system and an apparatus for supporting the same.

BACKGROUND ART

With the recent development of information communication technology, a variety of wireless communication techniques are being developed. From among them, a WLAN is technology for wirelessly accessing the Internet at homes or companies or in specific service providing areas using mobile terminals, such as a Personal Digital Assistant (PDA), a laptop computer, and a Portable Multimedia Player (PMP), based on radio frequency technology.

Lots of standardization tasks are being carried out since and Electronics Engineers (IEEE) 802 (i.e., a standard organization for WLAN technology) was set up on February, 1980. Initial WLAN technology was able to support the rate of 1 to 2 Mbps through frequency hopping, band spreading, and infrared communication by using a 2.4 GHz frequency in accordance with the IEEE 802.11 standard, but the recent WLAN technology can support a maximum rate of 54 Mbps by using Orthogonal Frequency Division Multiplexing (OFDM). Furthermore, in IEEE 802.11, the standards of various technologies, such as the improvements of Quality of Service (QoS), the compatibility of Access Point (AP) protocols, security enhancement, radio resource measurement, a wireless access vehicular environment, fast roaming, a mesh network, interworking with an external network, and wireless network management, are put to practical use or being developed.

IEEE 802.11b of the IEEE 802.11 supports a maximum transmission speed of 11Mbs while using the 2.4 GHz frequency band. IEEE 802.11a commercialized after IEEE 802.11b has reduced the influence of interference as compared with the very complicated 2.4 GHz frequency band by using a 5 GHz frequency band not the 2.4 GHz frequency band and also has improved the communication speed up to a maximum of 54 Mbps using OFDM technology. IEEE 802.11a, however, is disadvantageous in that the communication distance is shorter than that of IEEE 802.11b. Furthermore, IEEE 802.11g, like the IEEE 802.11b, implements a maximum communication speed of 54 Mbps using the 2.4 GHz frequency band and satisfies backward compatibility. Thus, IEEE 802.11g is significantly being in the spotlight and is superior to IEEE 802.11a even in the communication distance.

Furthermore, in order to overcome limitations to the communication speed that has been considered to be weakness in a WLAN, an IEEE 802.11n standard has recently been established as a technology standard. An object of the IEEE 802.11n standard is to increase the speed and reliability of a network and to expand the coverage of a wireless network. More particularly, in order to support a High Throughput (HT) having a maximum data processing speed of 540 Mbps or higher, minimize a transmission error, and optimize the data rate, the IEEE 802.11n standard is based on Multiple Inputs and Multiple Outputs (MIMO) technology using multiple antennas on both sides of a transmitter and a receiver. Furthermore, the HT WLAN system may use a coding scheme for transmitting several redundant copies in order to increase reliability of transmission data and may use Orthogonal Frequency Division multiplexing (OFDM).

As a WLAN is actively propagated and applications employing the WLAN are diversified, there is recently a need for a new WLAN system for supporting a throughput higher than the data processing speed supported by an HT WLAN system. A Very High Throughput (VHT) WLAN system is one of IEEE 802.11n WLAN systems which have recently been proposed in order to support a data processing speed of 1 Gbps or higher.

In IEEE 802.11 TGac in which the standardization of a VHT WLAN system is in progress, active research is being done on a scheme using 8×8 MIMO and a channel bandwidth of 80 MHz or higher in order to provide a throughput of 1 Gbps or higher.

The VHT WLAN system can support Multiple Input Multiple Output (MIMO) technology which is capable of transmitting data to a single user or multiple users at the same time by using a plurality of spatial streams.

When data is transmitted using a plurality of spatial streams, the spatial streams may experience different channel environments. Accordingly, a channel may need to be estimated for every spatial stream and a Modulation and Coding Scheme (MCS) to be used may need to be set.

In order to determine an MCS value to be applied to data that will be transmitted by an STA, an STA that will receive data may be requested to make feedback by deriving an MCS value. An STA requesting an MCS FeedBack (MFB) may be referred to as an MFB requester, and an STA sending the MFB in response to the MFB request may be referred to as an MFB responder. A procedure of the MFB requester receiving the MFB from the MFB responder through the MFB request is called a link adaptation procedure.

It is preferred that, when the MFB responder sends the MFB by deriving the MCS value in response to the MFB request, information (i.e., a basis to derive the MCS value) be determined by taking various factors that may have an effect on the transmission of data through subsequent actual spatial streams into account. In a VHT WLAN system using various coding schemes, various channel bandwidths, and a plurality of spatial streams, the factors may be further increased. However, to provide an MFB responder with information so that various factors may be all taken into account may be impossible or may be limited in terms of backward compatibility.

Accordingly, a method of an MFB responder feeding back a recommended MCS value, obtained by adaptively deriving an MCS, in response to MFB requests of various methods and a method of providing information so that an MFB responder can derive an optimum recommended MCS value need to be taken into consideration.

SUMMARY OF INVENTION

Technical Problem

An object of the present invention is to provide a method of an STA deriving a recommended MCS adaptively according to a channel environment and a method of feeding back a recommended MCS value in a WLAN system.

Another object of the present invention is to provide a method of efficiently sending information necessary to derive an MCS value to an STA that compute a recommended MCS.

Solution to Problem

In an aspect of the present invention, a method of determining a Modulation and Coding Scheme (MCS) feedback in a Wireless Local Area Network (WLAN) system includes an MCS FeedBack (MFB) responder receiving a first frame, including a request message requesting to send the MFB, from an MFB requester, and the MFB responder sending the MFB, including a recommended MCS value, to the MFB requester, wherein the recommended MCS value is derived with reference to at least one of unsolicit type information indicative of a type of the MFB, transmit type information indicative of a transmission type of data, coding type information indicative of a coding scheme applied to the data, a group ID indicative of a group of target stations (STAs) to which the data will be transmitted, and MFB bandwidth information indicative of a bandwidth of a channel.

The first frame may include a Physical Layer Convergence Procedure (PLCP) preamble, and the MFB responder may obtain the unsolicit type information, the transmit type information, the coding type information, the group ID, and the MFB bandwidth information which are implicitly transmitted through a VHT-SIG-A field included in the PLCP preamble.

The method may further include receiving a Null Data Packet (NDP) from the MFB requester after receiving the first frame, wherein the first frame includes an indication bit, informing that the NDP will be subsequently transmitted, after the first frame is transmitted.

The MFB responder obtains the unsolicit type information, the transmit type information, the coding type information, the group ID, and the MFB Bandwidth Information which are implicitly transmitted through a VHT-SIG-A field of a PLCP preamble included in the NDP.

The method may further comprising the MFB requester determining the MCS of the data with reference to the recommended MCS value and sending modulated and coded data by applying the determined MCS.

The method may further comprising the MFB responder receiving a NDP from the MFB requester after receiving the first frame, wherein the first frame is a management frame informing that the NDP will be subsequently transmitted after the first frame is transmitted.

The first frame may include a Medium Access Control (MAC) header, and the MAC header may include at least one of a subfield including the unsolicit type information, a subfield including the transmit type information, a subfield including the coding type information, a subfield including the group ID, and a subfield including the MFB bandwidth information.

In another aspect of the present invention, a link adaptation method in a Wireless Local Area Network (WLAN) system includes an MCS FeedBack (MFB) requester sending a first frame, including a request message requesting to send an MCS feedback, to an MFB responder, the MFB requester receiving an MFB, including a recommended MCS value, from the MFB responder, the MFB requester determining an MCS to be applied to data that will be subsequently transmitted with reference to the recommended MCS value, the MFB requester sending modulated and coded data to the MFB responder by applying the determined MCS, wherein the MFB responder derives the recommended MCS value with reference to at least one of unsolicit type information indicative of a type of the MFB, transmit type information indicative of a transmission type of data, coding type information indicative of a coding scheme applied to the data, a group ID indicative of a group of target stations (STAs) to which the data will be transmitted, and MFB bandwidth information indicative of a bandwidth of a channel.

The MFB requester may implicitly send the unsolicit type information, the transmit type information, the coding type information, the group ID, and the MFB bandwidth information, through a VHT-SIG-A field included in the PLCP preamble of the first frame.

The method may further include the MFB requester sending a Null Data Packet (NDP) after sending the first frame, wherein the first frame includes an indication bit, informing that the NDP will be subsequently transmitted, after the first frame is transmitted, and the MFB requester implicitly sends the unsolicit type information, the transmit type information, the coding type information, the group ID, and the MFB bandwidth information, through a VHT-SIG-A field of a PLCP preamble included in the NDP.

In still another aspect of the present invention, a Modulation and coding scheme FeedBack (MFB) responder includes a processor for determining a Modulation and coding scheme (MFC) in a Wireless Local Area Network (WLAN) system. The processor may be configured to receive a first frame, including a request message requesting to send an MFB, from an MFB requester, and send the MFB, including a recommended MCS value, to the MFB requester, wherein the recommended MCS value is derived with reference to at least one of unsolicit type information indicative of a type of the MFB, transmit type information indicative of a transmission type of data, coding type information indicative of a coding scheme applied to the data, a group ID indicative of a group of target stations (STAs) to which the data will be transmitted, and MFB bandwidth information indicative of a bandwidth of a channel.

The first frame may include a Physical Layer Convergence Procedure (PLCP) preamble, and the unsolicit type information, the transmit type information, the coding type information, the group ID, and the MFB bandwidth information are implicitly transmitted through a VHT-SIG-A field included in the PLCP preamble.

The processor may be configured to further receive a Null Data Packet (NDP) from the MFB requester after receiving the first frame, wherein the first frame includes an indication bit, informing that the NDP will be subsequently transmitted, after the first frame is transmitted.

The unsolicit type information, the transmit type information, the coding type information, the group ID, and the MFB Bandwidth Information may be implicitly transmitted through a VHT-SIG-A field of a PLCP preamble included in the NDP.

Advantageous Effects of Invention

A station (STA) that derives a recommended MCS value in response to an MFB request and feeds back the derived MCS value in a link adaptation procedure can adaptively derive the MCS value according to a type of the MFB request and feed back the derived MCS value. Furthermore, information necessary to derive an MCS can be efficiently provided to an STA that determines the MCS.

BRIEF DESCRIPTION OF DRAWINGS

FIG. 1 is a simplified diagram showing an exemplary configuration of a WLAN system to which an embodiment of the present invention may be applied;

FIG. 2 is a diagram showing the physical layer (PHY) architecture of the IEEE 802.11 standard;

FIGS. 3 to 6 show examples of PLCP frame formats;

FIG. 7 is a block diagram showing information included in a VHT-SIG field;

FIG. 8 is a block diagram showing subfields included in an HT control filed;

FIG. 9 illustrates a link adaptation procedure according to an embodiment of the present invention;

FIG. 10 is a simplified diagram showing a method of determining an MFB according to an embodiment of the present invention;

FIGS. 11 and 12 show examples of MCS feedback procedures in the channel sounding procedure using an NDP;

FIG. 13 is a simplified diagram showing a method of determining an MFB based on the VHT-SIG field-A symbol of an NDP frame;

FIGS. 14 to 17 show formats of VHT control fields according to embodiments of the present invention; and FIG. 18 is a block diagram showing a wireless apparatus in which the embodiments of the present invention are implemented.

MODE FOR THE INVENTION

Embodiments of the present invention are described in detail with reference to the accompanying drawings.

FIG. 1 is a simplified diagram showing an exemplary configuration of a WLAN system to which an embodiment of the present invention may be applied.

Referring to FIG. 1, the WLAN system includes one or more Basic Service Sets (BSSs). The BSS is a set of STAs which are successfully synchronized with each other for communication, but is not a concept indicating a specific area.

The BSS may be divided into an infrastructure BSS and an independent BSS (IBSS). The infrastructure BSS is shown in FIG. 1. The infrastructure BSSs BSS1 and BSS2 include one or more STAs STA1, STA3, and STA4, an Access Point (AP) (i.e., an STA providing distribution service), and a Distribution System (DS) coupling a plurality of APs AP1 and AP2. Meanwhile, in the IBSS, all STAs include mobile STAs because an AP is not included in the IBSS. Furthermore, the IBSS forms a selfcontained network because access to a DS is not permitted.

An STA is a specific function entity, including Medium Access Control (MAC) according to the IEEE 802.11 standard and a physical layer interface for a Wireless Medium (WM). In a broad sense, the STA includes both an AP and a non-AP STA.

An STA for wireless communication includes a processor and a Radio Frequency (RF) unit and may further include a user interface, display means, etc. The processor is a functional unit configured to generate frames to be transmitted over a wireless network or to process frames received over the wireless network. The processor performs several functions for controlling an STA. Furthermore, the RF unit is a unit functionally coupled to the processor and configured to transmit and receive frames over a wireless network for an STA.

A mobile terminal manipulated by a user, from among STAs, includes a non-AP STA (e.g., STA1, STA3, and STA4). When the mobile terminal is simply an STA, it is also called a non-AP STA. A non-AP STA may also be called another terminology, such as a Wireless Transmit/Receive Unit (WTRU), User Equipment (UE), a Mobile Station (MS), a Mobile Terminal (MT), or a Mobile Subscriber Unit (MSU).

Furthermore, the AP AP1 or AP2 is a functional entity for providing access to the DS via a WM for STAs associated therewith. In an infrastructure BSS including an AP, communication between non-AP STAs is basically performed via the AP. If a direct link is set up, however, the non-AP STAs may directly communicate with each other. The AP may also be called another terminology, such as a centralized controller, a Base Station (BS), a node-B, a Base Transceiver System (BTS), or a site controller.

A plurality of infrastructure BSSs may be interconnected through a Distribution System (DS). A plurality of BSSs coupled through the DS is called an Extended Service Set (ESS). STAs included in the ESS may communicate with each other. A non-AP STA may move from one BSS to the other BSS while performing seamless communication within the same ESS.

The DS is a mechanism for enabling one AP to communicate with the other AP. According to this mechanism, an AP may transmit a frame for STAs associated with a BSS managed by the AP, transfer a frame if one STA has moved to another BSS, or transfer a frame to an external network, such as a wired network. The DS needs not to be necessarily a network, and it is not limited to any form if the DS can provide specific distribution service defined in IEEE 802.11. For example, the DS may be a wireless network, such as a mesh network, or may be a physical structure for connecting APs together.

FIG. 2 is a diagram showing the physical layer (PHY) architecture of the IEEE 802.11 standard.

The PHY layer architecture of the IEEE 802.11 standard includes a PHY Layer Management Entity (PLME), a Physical Layer Convergence Procedure (PLCP) sublayer, and a Physical Medium Dependent (PMD) sublayer. The PLME provides a function of managing the PHY layer while operating in conjunction with a MAC Layer Management Entity (MLME). The PLCP sublayer transfers a MAC Protocol Data Unit (MPDU), received from a MAC sublayer, to the PMD sublayer or transfers a frame, received from the PMD sublayer, to the MAC sublayer according to an instruction of a MAC layer between the MAC sublayer and the PMD sublayer. The PMD sublayer is a lower layer of the PLCP sublayer, and it enables the transmission and reception of the PHY layer entity between two STAs through a WM.

The PLCP sublayer adds supplementary fields, including information necessary for a PHY layer transceiver, in a process of receiving an MPDU from the MAC sublayer and transferring the MPDU to the PMD sublayer. The added fields may include a PLCP preamble, a PLCP header, and tail bits over a data field in the MPDU. The PLCP preamble functions to have a receiver prepared for synchronization and antenna diversity, before a PLCP Service Data Unit (PSDU) (=MPDU) is transmitted. The PLCP header may include a field including information about a frame.

In the PLCP sublayer, a PLCP Protocol Data Unit (PPDU) is generated by adding the above fields to the MPDU and is then transmitted to a reception STA via the PMD sublayer. The reception STA receives the PPDU, obtains information necessary to restore data from the PLCP preamble and the PLCP header, and restores data based on the information.

The PLCP frame may have various formats according to WLAN systems. A WLAN system supporting the IEEE802.11n standard is hereinafter referred to as an HT WLAN system, and a WLAN system supporting standards (e.g. IEEE802.11a/b/g) prior to the IEEE802.11n standard is hereinafter referred to as a legacy WLAN system, for convenience of description.

FIGS. 3 to 5 show examples of PLCP frame formats.

The PLCP frame format of FIG. 3 is a PLCP frame format supporting a legacy WLAN system. The legacy PLCP frame includes a Legacy-Short Training Field (L-LTF), a Legacy-Short Training Field (L-STF), a Legacy Signal (L-SIG) field, and a data field. The L-STF is used for frame timing acquisition and Automatic Gain Control (AGC). The L-LTF is used for channel estimation for demodulating an L-SIG and data. The L-SIG field includes information necessary to demodulate and decode subsequent data.

The PLCP frame format of FIG. 4 is an HT Green Field PLCP frame format that may be used in an HT WLAN system consisting of only HT STAs. The HT Green Field PLCP frame includes an HT-GF-STF, an HT-LTF1, an HT-SIG field, HT-LTFs, and a data field. The HT-STF is used for frame timing acquisition and Automatic Gain Control (AGC). The HT-LTF1 and the HT-LTFs are used for channel estimation for demodulating an HT-SIG field and data. The HT-SIG field includes information necessary to demodulate and decode subsequent data.

The HT Green Field PLCP frame format is newly designed to efficiently support an HT system and cannot be correctly recognized by the STAs of a legacy system. Accordingly, the HT Green Field PLCP frame format cannot be used in a BSS in which a legacy STA and an HT STA coexist. An HT-Mixed PLCP frame format of FIG. 5 is used in an environment in which a legacy STA and an HT STA coexist. The HT-Mixed PLCP frame of FIG. 5 includes an L-STF, an L-LTF, and an L-SIG field for a legacy STA and an HT-SIG field and HT-LTFs for an HT STA. Fields from the L-STF to the HT-SIG field are transmitted without being beamformed so that they can be recognized by all STAs, and fields following the HT-STF are beamformed using a precoding matrix $Q_k$ and transmitted. Here, the HT-STF is transmitted between the HT-SIG field and the HT-LTFs so that a reception STA may take a sudden change of transmit power due to precoding into account.

The PLCP frame format of FIG. 6 is used in a VHT system. The PLCP frame format is similar to the PLCP frame format of FIG. 5, but differs from the PLCP frame format of FIG. 5 in that it includes a VHT-SIG-A field and a VHT-SIG-B field instead of the HT-SIG field. The VHT system has been in the spotlight as the next-generation system of an HT system, and MU-MIMO support is one of major characteristics which is different from the HT system. A larger amount of control information increased as compared with the HT system is transmitted through the two SIG fields (i.e., the VHT-SIG field-A field and the VHT-SIG field-B field).

FIG. 7 is a block diagram showing information included in the VHT-SIG field.

A VHT-SIG-A field includes two OFDM symbols (i.e., VHT-SIG-A1 and VHT-SIG-A2). Each of the VHT-SIG-A1 symbol and the VHT-SIG-A2 symbol includes information of 24 bits.

A BW field supports a bandwidth used and has a length of 2 bits. The BW may indicate 20 MHz, 40 MHz, 80 MHz, 160 MHz, or 80 MHz+80 MHz according to the setting of 2 bits. An STBC field has a length of 1 bit and indicates whether a transmitted spatial stream has Space Time Block Coding (STBC). A group ID field has a length of 6 bits and indicates a target transmit STA(s). An $N_{STS}$ field has a length of 12 bits, and it may be differently set according to an SU PPDU that is subject to MU-MIMO transmission and an SU PPDU that is subject to SU-MIMO transmission. In case of the MU PPDU, the $N_{STS}$ field is set to a value indicating the number of spatial streams allocated to each of a maximum of four target STAs. In case of the SU PPDU, the $N_{STS}$ field is set to 3 bits, indicating information about the number of allocated spatial streams, and information of 9 bits (a partial association ID of a receiver) indicating the receiver of the SU PPDU.

The VHT-SIG-A2 symbol includes short GI, coding, MCS, beamformed, CRC, and tail fields. The short GI field indicates whether a short guard interval has been applied to a data field. The coding field indicates a coding scheme used. In an SU PPDU, the MCS field is set to an MCS index value. In an MU PPDU, the MCS field indicates information about what coding scheme (i.e., a BCC coding scheme or an LDPC coding scheme) has been applied to data for each of the target reception STAs of an MU MPDU. The beamformed field has a length of 1 bit and indicates whether a beamforming steering matrix has been applied in case of an SU PPDU. The CRC field is used for error control, and the tail field is used to terminate the trellis of a convolutional decoder.

The VHT-SIG-B field includes a length field indicative of the length of a data field and an MCS field indicating an MCS applied to each target STA in an MU PPDU.

A VHT system can improve the throughput by sending a plurality of spatial streams through multiple antennas at the same time. For MIMO transmission, more precise channel condition information is required. In a VHT system, there are two kinds of channel sounding methods for obtaining channel condition information. One of the two channel sounding methods is a method based on a regular PPDU including an MAC header and a data field, and the other of the two channel sounding methods is a method that relies on a Null Data Packet (NDP). An NDP frame does not include an MAC header and a data field. If the channel sounding method according to the NDP is used, an information message informing that an NDP frame will be transmitted must be transmitted before the NDP frame is transmitted. In a VHT system, the information message may be included in a VHT control field included in the MAC header of an MAC frame and then transmitted or may be transmitted through an NDPA frame.

FIG. 8 is a block diagram showing subfields included in an HT control filed.

The HT control field includes VHT, link adaptation control, calibration position, CSI/steering, NDP announcement, AC constraint, and RDG/more PPDU subfield. The VHT subfield has a length of 1 bit (B0) and indicates a format of the HT control field. The HT control field may be set as an HT mode or a VHT mode according to the setting of the VHT subfield. The VHT control field hereinafter means that the VHT subfield of the HT control field has been set as the VHT mode.

A link adaptation control subfield related to embodiments of the present invention is chiefly described hereinafter, and a description of other subfields not directly related to embodiments of the present invention is omitted.

The link adaptation control subfield includes a TRQ subfield (B1), an MAI subfield (B2-B5), an MFSI subfield (B6-B8), and an MFB/ASELC subfield (B9-B15). The name TRQ of the TRQ subfield means Training ReQuest, and an STA (responder) that receives a PPDU including the TRQ subfield can know whether to send a sounding PPDU based on the TRQ subfield. If the sounding PPDU for channel estimation is sought to be requested, the TRQ subfield may be set to 1. The MAI subfield may indicate that it is an MCS request (MRQ) or may instruct that the MFB/ASELC subfield subsequently transmitted be interpreted as antenna selection indication (ASELI) according to its setting value. When the MAI subfield is interpreted as an MCS request, 4 bits of the MAI subfield include 1 bit, indicating whether it indicates an MCS Feedback (MFB) request, and 3 bits indicating an MRQ Sequence Identifier (MSI). The MFSI subfield may be set to any MSI value within a range of 0 to 6 or may be set to 7 in order to indicate that it is an MFB not requested. The MFB/ASELC subfield may be set to antenna selection information (when the MAI subfield indicates ASELI) or may be set to a recommended MFB value (when the MAI subfield indicates an MCS request) according to the setting of the MAI subfield.

FIG. 9 illustrates a link adaptation procedure according to an embodiment of the present invention.

FIG. 9 shows an example where an AP performs MU-MIMO transmission to an STA1, an STA2, and an STA3. In the example of FIG. 9, the AP becomes a requester that requests an MFB, and the STA1 to the STA3 become responders that send the MFBs in response to the request. The AP sends a data PPDU 910. The data PPDU 910 may have the format shown in FIG. 6. The data field of the data PPDU 910 includes an MAC header. The AP may request a reception STA to send the MFB thereto by setting an MRQ bit in the MAC header as described above. The STA1, the STA2, and the STA3 that have received the data PPDU 910 send confirmation messages, informing that the data PPDU 910 has been successfully received, to the AP. Block ACK (BA) message 921, 922, and 923 are examples of the confirmation messages. When the STA1 sends the BA 921 as the reception confirmation message, the MFB in which an MCS value recommended by the STA1 has been set may be included in the BA 921 in response to MRQ. Next, when the AP sends a poll BAR 912 and a poll BAR 913 to the STA2 and the STA3, the STA2 sends the BA 922 to the AP and the STA3 sends the BA 923 to the AP. The MFB of the STA2 may be included in the BA 922, and the MFB of the STA3 may be included in the BA 923.

The AP may determine MCS values to be applied to data that will be transmitted to the STA1, the STA2, and the STA3 with reference to the MFBs received from the STA1, the STA2, and the STA3. FIG. 9 shows an example where the MFB transmitted from the STA1 to the AP through the BA 921 has been incorporated into the MCS value applied to the data, transmitted to the STA1 and included in the data PPDU 950 transmitted by the AP.

The present invention proposes a method in which an STA (i.e., responder) that has been requested to send an MFB determines a recommended MCS value. The recommended MCS value refers to an MCS value recommended by a responder that has received an MRQ to request MFB transmission.

According to an embodiment of the present invention, a responder may refer to a control signal included in the PLCP preamble of a PPDU including an MRQ when determining a recommended MCS value and a type. In the example of FIG. 9, a responder STA1 may refer to VHT-SIG-A information included in the PLCP preamble of the data PPDU 910 including the MRQ. Table 1 shows pieces of information of VHT-SIG fields that may be referred by a responder in determining a recommended MCS.

TABLE 1

| VHT-SIG | Bits | Field | Bit-Allocation | Derivation of MCS type |
|---|---|---|---|---|
| VHT-SIG-A1 | B4-B9 | group ID | 6 | SU-MIMO or MU-MIMO |
| | B3 | STBC | 1 | Whether Alamouti is used or not |
| VHT-SIG-A2 | B8 | Beam-formed | 1 | Whether Beamforming is used or not |

The STA1 may know a transmit type through the B4-B9 bits of the VHT-SIG-A1 symbol of the data PPDU 910 and know whether a Tx diversity scheme, such as Alamouti, has been used based on the B3 bit of the VHT-SIG-A1 symbol. Likewise, the STA1 may know whether beamforming has been applied based on the B8 bit of the VHT-SIG-A2 symbol. In case of MU-MIMO transmission, however, beamforming is always applied. Thus, in case of SU-MIMO transmission, a problem may occur in interpreting the B8 bit of the VHT-SIG-A2 symbol. If a transmit type is known to be SU-MIMO transmission based on the B4-B9 bits of the VHT-SIG-A1 symbol, pieces of information that may be obtained by a responder through the B8 bit of the VHT-SIG-A2 symbol are summarized in Table 2.

TABLE 2

| | SU-MIMO | STBC field (B3 in VHT-SIG-A1) | |
|---|---|---|---|
| | | 0 (No STBC) | 1 (STBC) |
| Beamformed field (B8 in VHT-SIG-A2) | 0 (Open Loop) | Open Loop Spatial Multiplexing | Open Loop Alamouti, including double Alamouties |
| | 1 (Beam-formed) | TxBF (Transmit Beamforming) | NA |

According to an embodiment of the present invention, when a responder determines a recommended MCS, ambiguity may be reduced. Furthermore, a responder may obtain channel estimate coefficients from a VHT-LTF field and use the channel estimate coefficients to compute an MFB. This method is more efficient than a method of checking an MFB type based on information obtained by decoding the data region of a data PPDU and of obtaining channel estimation coefficients again in order to compute an accurate MFB.

FIG. 10 is a simple diagram showing a method of determining an MFB according to an embodiment of the present invention.

When receiving a PPDU including the MRQ of FIG. 11, an MFB responder obtains information necessary to determine a recommended MCS from the VHT-SIG-A field of the received PPDU and determines a type of the MFB and an MCS value.

A method of referring to implicit-related information in determining the type of the MFB and the recommended MCS value according to an embodiment of the present invention may also be applied to the channel sounding procedure using an NDP.

FIGS. 11 and 12 show examples of MCS feedback procedures in the channel sounding procedure using an NDP.

FIG. 11 shows an example where a PPDU including an MRQ is broadcasted (not beamformed), and FIG. 12 shows an example where a PPDU including an MRQ is unicasted. Both the examples of FIGS. 11 and 12 show that the NDP is transmitted. As described above, the PPDU transmitted prior to the NDP includes a message (i.e., NDP announcement) informing that the NDP will be transmitted subsequently. In the examples of FIGS. 11 and 12, the PPDU including the MRQ may do not include a VHT PLCP preamble.

According to another embodiment of the present invention, if an MFB responder knows that an NDP is scheduled to be transmitted, the MFB responder may do not rely on the VHT-SIG field-A symbol of the PLCP preamble of a PPDU including an MRQ, but may determine a type of the MFB and a recommended MCS with reference to the VHT-SIG field-A symbol of the PLCP preamble of the NDP. This method is advantageous in that it may be applied to a case where the PPDU including the MRQ is transmitted in a format not having the VHT-SIG field-A symbol. Furthermore, a beamforming matrix may be selected from a PPDU including an MRQ and a PPDU (NDP) actually used by an MFB responder in order to compute an MFB. If a beamformed NDP is used, an MFB responder may determine an MFB with reference to the VHT-SIG field-A symbol of an NDP, not a PPDU including an MRQ and an NDP.

FIG. 13 is a simplified diagram showing a method of determining an MFB based on the VHT-SIG field-A symbol of an NDP frame.

An NDPA, informing that an NDP 1320 will be transmitted subsequently, and a PPDU 1310 including a TRQ are transmitted. Next, when an NDP 1320 is transmitted, an MFB responder that has received the PPDU 1310 and the NDP 1320 may determine an MFB based on the VHT-SIG field-A 1325 of the NDP 1320. Here, information that may be referred in the VHT-SIG field-A 1325 may be the same as Table 1 and Table 2.

If an MRQ is transmitted through a VHT control field, an MFB requester and an MFB responder may be operated as follows. If the MFB requester wants to obtain proper $N_{STS}$, MCS, and SNR values from the MFB responder, the MFB requester may initiate a link adaptation procedure by sending a PPDU, including an MRQ and an MSI. The MFB responder may determine the $N_{STS}$, MCS, and SNR values to be included in the MFB based on the TX_Vector of a PPDU including the MRQ and the MSI. TX_Vector includes information about a bandwidth, a coding scheme (BCC/LDPC), GID (transmit scheme information, SU-MIMO/MU-MIMO), and the setting of $N_{STS}$. If the MRQ is included in the VHT control field of the NDPA PPDU and transmitted (in other words, a link adaptation procedure is initiated by the NDPA frame), the MFB responder may compute a recommended MCS value based on the NDP frame when determining the MFB.

If the MRQ transmitted through the NDPA frame is transmitted to a plurality of STAs, including an STA scheduled to perform SU-MIMO transmission and an STA scheduled to perform MU-MIMO transmission, an MFB operation must be changed according to an MIMO type (SU/MU). This is because a transmitted sounding frame is suitable for SU-MIMO not for MU-MIMO. A target STA scheduled to perform SU-MIMO transmission sends an MFB including an MFSI number corresponding to the MSI number of an MRQ field.

An STA scheduled to perform MU-MIMO transmission may have several numbers of cases. First, an STA scheduled to perform MU-MIMO transmission may not send any MFB because it does not have a relevant MCS. If the MFB is not transmitted (in particular, the same MSI is used in next transmission), however, ambiguity may be caused. Second, an STA scheduled to perform MU-MIMO transmission may send information indicating that MFB indication is not included. For example, a preset value (e.g., 127), indicating that an MFB having an MFSI number corresponding to the MSI number of an MRQ field is not transmitted, may be transmitted. In this case, ambiguity in determining and sending an MFB may be overcome irrespective of a type of MIMO transmission.

In the link adaptation procedure of an HT system, information for an MCS request and MCS feedback is transmitted through the HT control field of FIG. 8. When the HT control field is applied to a VHT system, however, some pieces of information included in the HT control field are not necessary in the VHT system. In the VHT system, it is inefficient to include unnecessary information in the VHT control field and send the VHT control field including the unnecessary information. In the VHT system, it is efficient to include information that may be referred by an MFB responder, in determining an MCS value and an MFB type, in the VHT control field and to send the VHT control field including the information in the link adaptation procedure, instead of including the unnecessary information in the VHT control field and sending the VHT control field. The former method may be a method of indirectly obtaining information to be referred in computing an MCS value based on a VHT-SIG-A field, whereas the latter method may be a method of directly obtaining information to be referred in computing an MCS value based on a VHT-SIG-A field.

In the example of FIG. 8, the TRQ, calibration position, calibration sequence, CSI/steering, and NDP announcement field may be unnecessary information in a VHT system. Unlike an HT system having an implicit MFB procedure of performing a link adaptation procedure in addition to another procedure or data transmission, a VHT system does not have an explicit MFB procedure. As a representative example, in a VHT system, the CSI/steering field and the NDP announcement field may be omitted from the VHT control field because an additional NDPA frame is transmitted prior to the transmission of an NDP.

Table 3 shows an example of additional information that may be provided to an MFB responder according to an embodiment of the present invention. The field names of Table 3 are arbitrary, and the fields may be transmitted through the VHT mode of the HT control field (i.e., a VHT control field) or may be transmitted through an additional frame. When the fields of Table 3 are transmitted through the VHT control field, they may replace some fields of the HT control field that may be omitted in the VHT system.

TABLE 3

| Information Field | Description |
| --- | --- |
| Unsolicit type information | Determines whether the MFB is for solicit feedback or unsolicit feedback. In case of solicit feedback, the MFB is a response to an MRQ in which the MRQ is indicated by an MFSI sequence index. The MFSI sequence index may have the same value as an MSI sequence index configured for the MRQ. |
| Transmit type information | Information to differentiate transmission waveforms or transmission scheme types. The information can potentially differentiate following transmission schemes {Transmit Diversity(Alamouti) based transmission, Beamformed transmission, Un-beamformed transmission, SU-MIMO transmission, MU-MIMO transmission} |
| Coding type information | The information is to inform which coding type unsolicit (or even solicit) MFB feedback may be used upon. This can also hints the coding type the reference the PPDU was being transmitted which was used to compute an MFB. |
| Group ID | The group ID is to indicate a corresponding GID of MU-MIMO transmission for an unsolicit MFB. The GID can also be utilized to indicate SU-MIMO transmission with an explicit state(s) reserved for SU-MIMO transmission. |
| MFB Bandwidth Information | The information is to inform a bandwidth on which unsolicit (or even solicit) MFB is based. |
| TXOP Power Save Mode | Power saving management information for power save in units of TXOP |

FIGS. 14 to 17 show formats of VHT control fields according to embodiments of the present invention.

The VHT control fields of FIGS. 14 to 17 show examples of HT control fields when the B0 bit of an HT control field is a VHT mode and each include supplementary fields illustrated in Table 3. As described above, subfields that may be omitted in a VHT system, from among the subfields of a conventional HT control field, may be omitted and replaced with the subfields of Table 3. In this case, information necessary for a link adaptation procedure may be provided without changing the length (4 octets) of the conventional HT control field. In other words, a more accurate MFB value can be determined in a VHT system while maintaining compatibility with a conventional system.

In the formats of FIGS. 14 to 17, a Solicit/Unsolicit field may have a length of 1 bit and may perform a function of Unsolicit Type Information of Table 3. As a detailed example, when the Solicit/Unsolicit field is set to 0, an MFSI/Unsolicit Type-L field of 3 bits and an Unsolicit Type-H 3 field of bits may be set to a GID value of 6 bits. When the Solicit/Unsolicit field is set to 0, an MFB responder may know that it is MU-MIMO transmission through the MFSI/Unsolicit Type-L field of 3 bits and the Unsolicit Type-H field of 3 bits. Here, a specific value (e.g., '111111') from the GID value of 6 bits may be used to indicate SU-MIMO transmission. When the Solicit/Unsolicit field is set to 1, the MFSI/Unsolicit Type-L field of 3 bits may be set to a value indicating an MFSI. The use of the Unsolicit Type-H field of 3 bits may be reserved. The example of FIG. 15 shows that the Unsolicit Type-H field may have a length of 2 bits. In this case, in the above operation, the GID value of 6 bits may be replaced with a GID value of 5 Least Significant Bits (LSBs).

In the formats of FIGS. 14 to 17, a Tx Type field or an FB Tx Type field is an example of a field for sending Transmit Type Information of Table 3. The Tx Type field may indicate whether beamforming has been applied, whether Alamouti has been applied, etc. A Coding Type field is an example of a field for sending Coding Type Information of Table 3. The Coding Type field may indicate a BCC scheme or an LDPC scheme according to its setting. An MFB BW field of FIG. 17 is an example of a field for sending MFB Bandwidth Information of Table 3. The MFB BW field may indicate a bandwidth of an MFB (e.g., 20 MHz, 40 MHz, 80 MHz, or 160/80+80 MHz) according to the setting of an MFB BW field value.

In a link adaptation procedure, an MFB responder may obtain Unsolicit Type Information, Transmit Type Information, Coding Type Information, Group ID, MFB Bandwidth Information, and TXOP Power Save Mode through the VHT control field from the MAC header of a PPDU having a VHT format and determine an MCS value by taking them into account. The MFB responder includes the determined MCS value in the MFB and then sends the MFB to an MFB requester. Next, the MFB requester may determine an MCS value with reference to the received MFB, modulate and code data using the determined MCS value, and send the resulting data.

FIG. 18 is a block diagram showing a wireless apparatus in which the embodiments of the present invention are implemented. The wireless apparatus 1800 may be an MFB requester or an MFB responder in the link adaptation procedure according to the embodiment of the present invention. The MFB requester may be an AP supporting MU-MIMO/SU-MIMO transmission. The MFB responder may compute an MCS value and send an MFB to a non-AP STA according to the link adaptation procedure according to the embodiment of the present invention.

The wireless apparatus 1800 includes a processor 1810, memory 1820, a transceiver 1830, and multiple antennas 1850. The transceiver 1830 may be configured to send and/or receive a frame and a data packet necessary to perform the link adaptation procedure of the present invention. The processor 1810 is functionally coupled to the transceiver 1830 and configured to compute an MCS value and generate a frame for implementing the embodiments of the present invention. The processor 1810 and the transceiver 1830 may implement the physical layer and the MAC layer of IEEE 802.11. The processor 1810 or the transceiver 1830 or both may include Application-Specific Integrated Circuits (ASICs), other chipsets, logic circuits, and/or data processors. The memory 1820 may include Read-Only Memory (ROM), Random Access Memory (RAM), flash memory, memory cards, storage media and/or other storage devices. When the embodiment is implemented in software, the above scheme may be implemented using a module (process or function) which performs the above function. The module may be stored in the memory 1820 and executed by the processor 1810. The memory 1820 may be placed inside the processor 1810 or may be placed outside the processor 1810 and coupled to the processor 1810 by a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for link adaptation in a wireless local area network, the method comprising:
   receiving, by a responding station from a requesting station, a request frame indicating a request for a modulation and coding scheme feedback (MFB);
   in response to the request frame, configuring, by the responding station, the MFB,
   wherein a frame used by the responding station for configuring the MFB is differently determined based on whether the request frame is a physical layer protocol data unit (PPDU) carrying the request for the MFB or a null data packet announcement (NDPA) frame,
   wherein the MFB is configured based on the PPDU if the request frame is the PPDU,
   wherein the MFB is configured based on a null data packet (NDP) frame transmitted following the NDPA frame if the request frame is the NDPA frame,
   wherein the PPDU includes a Very High Throughput (VHT) signal (VHT-SIG) field,
   wherein the VHT-SIG field includes a group identifier, a beamforming indicator, and a space-time block coding (STBC) indicator indicating whether an STBC is used for the PPDU,
   wherein the group identifier indicates whether a single user multiple-input and multiple-output (SU-MIMO) scheme is applied to the PPDU or a multiple user MIMO (MU-MIMO) scheme is applied to the PPDU,
   wherein the beamforming indicator indicates whether a beamforming is applied to the PPDU, and
   wherein if the request frame is the PPDU, the MFB is configured at least based on the group identifier, the beamforming indicator, and the STBC indicator; and
   transmitting, by the responding station to the requesting station, the MFB.

2. The method of claim 1, wherein the VHT-SIG field includes information fields indicating a bandwidth, a number of spatial streams and a coding scheme.

3. The method of claim 2, wherein the MFB includes information regarding a modulation and coding scheme and a number of spatial streams.

4. The method of claim 3, wherein the number of spatial streams indicated by the MFB is equal to or less than the number of spatial streams indicated by the VHT-SIG field.

5. A wireless device for link adaptation in a wireless local area network, the wireless device comprising:
   a transceiver; and
   a processor operatively coupled to the transceiver and configured to:
      receive, from a requesting station, a request frame indicating a request for a modulation and coding scheme feedback (MFB),
      in response to the request frame, configure the MFB,
      wherein a frame used by the responding station for configuring the MFB is differently determined based on whether the request frame is a physical layer protocol data unit (PPDU) carrying the request for the MFB or a null data packet announcement (NDPA) frame,
      wherein the MFB is configured based on the PPDU if the request frame is the PPDU,
      wherein the MFB is configured based on a null data packet (NDP) frame transmitted following the NDPA frame if the request frame is the NDPA frame,
      wherein the PPDU includes a Very High Throughput (VHT) signal (VHT-SIG) field,
      wherein the VHT-SIG field includes a group identifier, a beamforming indicator, and a space-time block coding (STBC) indicator indicating whether an STBC is used for the PPDU,
      wherein the group identifier indicates whether a single user multiple-input and multiple-output (SU-MIMO) scheme is applied to the PPDU or a multiple user MIMO (MU-MIMO) scheme is applied to the PPDU,
      wherein the beamforming indicator indicates whether a beamforming is applied to the PPDU, and
      wherein if the request frame is the PPDU, the MFB is configured at least based on the group identifier, the beamforming indicator, and the STBC indicator, and
      transmit, to the requesting station, the MFB.

6. The wireless device of claim 5, wherein the VHT-SIG field includes information fields indicating a bandwidth, a number of spatial streams and a coding scheme.

7. The wireless device of claim 6, wherein the MFB includes information regarding a modulation and coding scheme and a number of spatial streams.

8. The wireless device of claim 7, wherein the number of spatial streams indicated by the MFB is equal to or less than the number of spatial streams indicated by the VHT-SIG field.

* * * * *